United States Patent Office 3,733,301
Patented May 15, 1973

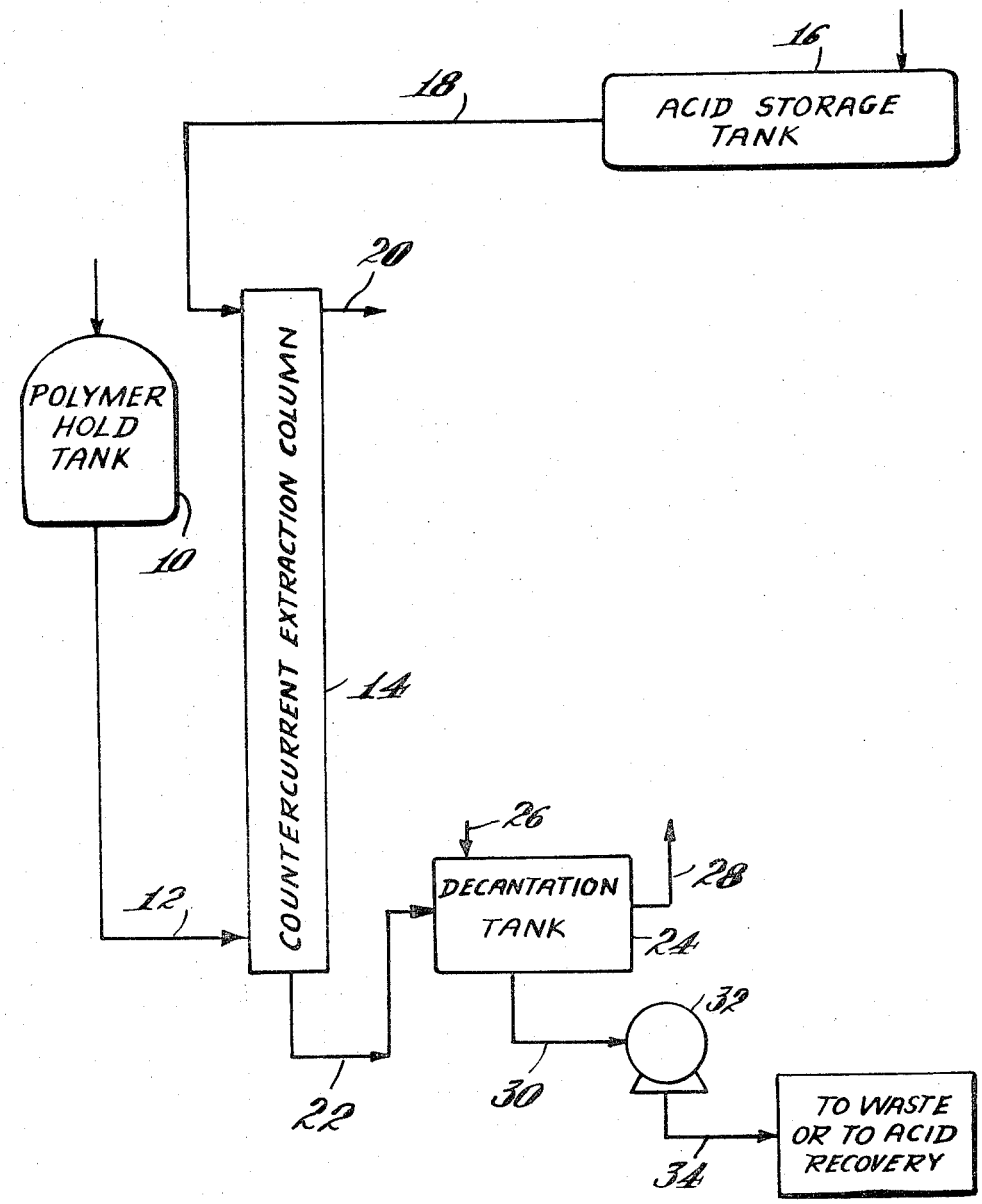

3,733,301
SEPARATION AND RECOVERY OF CATALYST RESIDUE
Michael M. Modan, 24 Buckingham Drive, Albany, N.Y. 12208
Original application Feb. 16, 1970, Ser. No. 11,747. Divided and this application May 4, 1971, Ser. No. 140,272
Int. Cl. C07c 85/16; C08g 23/18
U.S. Cl. 260—47 ET   5 Claims

ABSTRACT OF THE DISCLOSURE

The invention relates to separation and recovery of copper-amine complex catalyst residues from a reaction stream in a process for the formation of polyphenylene ethers by an oxidative coupling polymerization reaction. The process comprises simultaneously terminating the reaction and extracting catalyst residue by contact of the reaction solution with an aqueous acid solution in a countercurrent, liquid-liquid extraction column. The polymer is then recovered from the reaction solution substantially free of catalyst residue. The amine is recovered from the aqueous acid solution by pH adjustment with alkali and may be re-used if desired. The process of the invention is less expensive than prior art procedures and provides more effective catalyst removal than other commercially acceptable methods.

---

This is a division of application Ser. No. 11,747, filed Feb. 16, 1970, now Pat. No. 3,630,995.

BACKGROUND OF THE INVENTION

(1) Introduction

This invention relates to synthetic resins formed from phenols, and more particularly, to separation and recovery of catalyst residue from a reaction solution in the formation of polyphenylene ethers.

(2) Description of the prior art

The polyphenylene ethers and processes for their formation are known in the art and described in numerous publications including U.S. Pat. Nos. 3,306,874 and 3,306,875 of Allan S. Hay incorporated herein by reference.

The process of the aforesaid Hay Patent 3,306,875 involves the self-condensation of a monovalent phenolic precursor using a catalyst comprising a tertiary amine-basic cupric salt complex. The phenols which may be polymerized by the process correspond to the following structural formula:

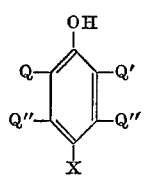

where X is a substituent selected from the group consisting of hydrogen, chlorine, bromine and iodine; Q is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and phenol nucleus; Q' and Q'' are the same as Q and in addition, halogen with the proviso that Q, Q' and Q'' are all free of a tertiary alpha-carbon atom.

Polymers formed from the above-noted phenols will correspond to the following structural formula:

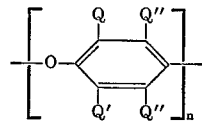

where the oxygen ether atom of one repeating unit is connected to the phenylene nucleus of the next repeating unit; Q, Q' and Q'' are as above defined; and $n$ is a whole integer equal to at least 100.

The process of the aforesaid U.S. Pat. No. 3,306,874 is similar to that of 3,306,875, but differs in the use of primary and secondary amines in place of the tertiary amines in the formation of the complex catalyst.

In accordance with the process of the two Hay patents, the polymerization reaction may be terminated by destroying the catalyst system for example, by the addition of an acid, preferably a mineral acid such as hydrochloric acid or sulfuric acid, with an organic acid such as acetic acid or a base such as lime, sodium hydroxide, potassium hydroxide and the like which reacts with the complex of the amine and copper salt destroying the same. Alternatively, the polymer product is removed from the presence of the catalyst either by filtering off the product if it precipitates during the polymerization reaction, or by pouring the reaction mixture into a material which is a solvent for the catalyst system, but a non-solvent for the product. Alternatively, the copper may be precipitated as an insoluble compound and filtered from the solution, or a chelating agent may be added which inactivates the copper. As a further alternative, the solution may be passed over an active adsorbant for the catalyst and other by-products.

From the commercial standpoint, the most economical method for terminating the polymerization reaction involves destroying the catalyst system with an acid. In the past, the has been attempted using various methods including admixture of the acid with the polymer solution in a tank followed by absorption of the acid containing the catalyst residue in a material such as a filter aid. Alternatively, the admixture of the acid and the reaction solution has been passed to a centrifuge where two phases form which are separated from each other. Though these methods are more economical than the other methods noted above, the process is still costly since approximately 35 pounds of acid are required per 100 pounds of polymer formed. Moreover, insufficient amine is removed from the polymer solution using these methods.

STATEMENT OF THE INVENTION

The present invention provides a new method for terminating an oxidative coupling polymerization with an acid while simultaneously extracting catalyst residue which method uses substantially less acid per pound of polymer formed and which removes substantially all catalyst residue from the reaction solution. The method comprises extracting the reaction catalyst residue by contact of the reaction solution, at a desired termination point, with an aqueous acid solution in a countercurrent, liquid-liquid extraction column and thereafter recovering the polymer from solution substantially free of catalyst residue. Amine is then recovered from the acid phase by adjustment of the pH to exceed 9.5 and preferably within a range of 9.5 to 10.5. At these pH values, the amine separates as a separate layer.

The method of the present invention is applicable to the formation of polyphenylene ethers by an oxidative coupling reaction in the presence of a copper-amine complex catalyst. If catalyst residue were not removed from the reaction solution, it would be recovered with the polymer and contaminate the same resulting in discoloration and degration.

DESCRIPTION OF THE PREFERRED EMBODIMENTS

Polymer is formed in accordance with the invention by passing an oxygen containing gas through a solution containing a phenolic monomer and the catalyst formed from the amine and copper salt dissolved in a solvent. The process is broadly applicable to those phenols disclosed in the above-noted Hay patents, but is preferably used with phenols corresponding to the following formula:

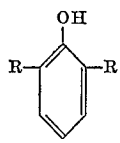

where each R represents a hydrocarbon preferably having from 1 to 8 carbon atoms. Examples of preferred phenols include 6-dimethylphenol, 2,6-diethylphenol, 2-methyl-6-ethyl phenol, 2,6-dibutyl phenol, 2-methyl-6-propyl phenol, 2-methyl-6-phenyl phenol and 2-methyl-6-allyl phenol. The most preferred phenol is 2,6-dimethyl phenol.

The primary or secondary amine component of the catalyst complex corresponds to that disclosed in the above-noted United States Patent No. 3,306,874 while the tertiary amine component of the catalyst complex corresponds to that disclosed in the above-noted United States Patent No. 3,306,875. Representative examples of suitable amines include aliphatic amines including cycloaliphatic amines where the cycloaliphatic group is substituted on the amine nitrogen, for example, mono-, di-, and tripropyl amine; mono- and dibutyl amine; mono and disecondary propyl amine; mono-, di-, and tricyclohexylamine; ethylmethyl amine; diethylmethyl amine; morpholine; methylcyclohexylamine; N,N'-dialkylethylene diamines; N,N'N, - trialkylethylene diamine; the N,N' - dialkyl propane diamines; the N,N,N'-trialkylpentane diamines, and the like.

Typical examples of copper salts suitable for the process include cuprous chloride, cupric chloride, cupric bromide, cuprous sulphate, cupric sulphate, cupric azide, cupric tetraamine sulphate, cuprous acetate, cupric acetate, cupric butyrate, cupric toluate and the like.

Additional examples of suitable amines and copper salts, as well as concentration limits and reaction parameters, may be found in the above-noted U.S. Patents Nos. 3,306,874 and 3,306,875, both incorporated herein by reference.

It should be noted that in addition to the processes depicted in the above two referenced patents of Hay, the process of the subject invention is also applicable to the oxidative coupling polymerization reactions disclosed in commonly-assigned U.S. patent applications Ser. Nos. 807,047; 807,076; 807,126; and 849,508, all incorporated herein by reference and any other processes for the formation of polyphenylene ethers using a copper-amine complex catalyst system for the oxidative coupling polymerization reaction.

The solvent for the reaction stream may be any of the solvents described in the aforesaid patents of Hay, but aromatic solvents such as benzene, toluene and xylene are preferred.

At the point where polymer build-up reaches a desired end point, the product stream comprises a solution of polymer, typically in an amount from 2 to 15% by weight, copper and amine catalyst residue, typically in amounts of from 0.5 to 2.0% by weight amine and from 0.1 to 1.5% copper, and minor amounts of other materials such as various promoters, unreacted monomer and the like.

At the desired conclusion of the polymerization reaction, it is terminated and catalyst residue removed from the reaction solution in a multistage extraction column by a solvent extraction process using an aqueous acid stream as the extractant. The aqueous acid stream acts to both inactivate copper-amine catalyst, thus terminating the polymerization reaction, and extract the catalyst from the reaction stream. Any acid such as hydrochloric acid, sulfuric acid, nitric acid or acetic acid may be used as the extractant, but an aqueous acetic acid stream is preferred as it is inert to the polyphenylene ethers and is exceptionally efficient in removing catalyst residue from the reaction stream.

The concentration of the acid in the aqueous acid stream preferably varies between 10 and 30% by weight. Though amounts in excess of 30% might appear to be indicated by highe rspecific gravity and pH differential with more concentrated acid streams, problems are encountered due to acid solubility in the polymer stream resulting in loss of acid. On the other hand, when the concentration of acid in the aqueous acid stream is low, i.e. less than 10% by weight, the extraction efficiency is low because of poor reactivity of the acid with the catalyst complex resulting in little extraction of copper and amine residue.

As should be obvious to those skilled in the art, the ratio of polymer stream to acid stream in the multistage extraction column is dependent upon numerous factors such as partition coefficient, concentration of materials in the various streams and the like. There are several advantages to using a high ratio of polymer to acid solution. First, a smaller volume of aqueous phase will result in a higher concentration of amine in the extract coming out of the column and will facilitate amine recovery. In addition, since the capacity of a given column is based upon the combined flow of light and heavy phases, a lower volume of the acid phase will enable a higher flow rate of polymer solution. On the other hand, a very high phase ratio will result in poor dispersion and poor mass transfer. Therefore, for purposes of this invention, using an aqueous acid phase containing between 10 and 30% by weight of the acid, it is desirable that the ratio of the organic phase or reaction solution to the aqueous phase or acid solution vary betwen 50:1 and 15:1 with the higher ratios being used at higher concentrations of the aqueous acid phase.

Following extraction of the copper-amine catalyst with the acid solution, the amine may be recovered from the acid solution by pH adjustment of the acid stream with a suitable alkali such as sodium or potassium hydroxide. It has been found that the amine separates from the acid stream as a separate layer at pH in excess of 9.5 and preferably between 9.5 and 10.5. In addition, the copper precipitates from alkaline solution. The amine can be separated by any convenient means such as by decantation and copper can be recovered by any convenient means such as by filtration. A most preferred pH for this operation is about 10.0 since at this lower pH, the amount of alkali required is less than at a higher pH.

For a better understanding of the invention, its objects and advantages, reference should be had to the following description and accompanying drawing which is a diagrammatic illustration of the preferred embodiments of an apparatus adapted to practice this invention.

Referring to the drawing, a reaction solution from a reactor (not shown) containing amine and copper residues along with polymer is pumped to hold tank 10 and withdrawn continuously through conduit 12 into a continuous, countercurrent, multistage liquid-liquid extracttion column 14. The extraction column may be of any convenient design capable of providing a sufficient number of theoretical extraction stages to effect the desired separation of copper and amine. A conventional packed column may be used for example, as well as a pierced-plate column, a bubble-plate column or a column containing alternate zones of quiescence and turbulence.

Aqueous acid solution is fed continuously from the acid storage tank 16 through a conduit 18 into the extraction column 14.

Since the density of the acid solution exceeds the density of the polymer solution, the acid solution descends through the column dissolving the amine and copper residue in the feed while the lighter polymer solution passes countercurrently upward through the column. Polymer solution substantially free of amine and copper residue is recovered from the top of column 14 through conduit 20. The polymer may then be recovered from its reaction solution by any convenient means known in the art such as by precipitation with a non-solvent for the polymer such as methanol.

ene) ether, all constituents dissolved in toluene. The extraction column used was a six inch Mixco column equipped with an agitator through the center of the column. Polymer feed solution was fed through a rotameter to the bottom of the column from a hold tank. A 10–30% aqueous acetic acid solution was metered into the top of the extraction column using a positive displacement pump. The effects of flow rates, agitator speed in the column, and acid concentrations were evaluated. Samples of light and heavy phase effluents were taken after the liquid in the column was replaced four times and a steady state was reached. The concentration of the dibutyl amine in each stream was measured by titration with perchloric acid and the number of theoretical stages required to reach this concentration was determined from the concentration and the equilibrium lines earlier obtained under laboratory conditions. The stage efficiency under operating conditions was calculated by dividing the number of equilibrium stages by 10, the number of actual stages. The results of this series of experiments are set forth in the following table:

| Run number | Agitator speed, r.p.m. | Polymer flow, g.p.m. | Acid flow, g.p.m. | | | Amine in feed | | | Amine in product | | | Acid consumption, lbs./100 lbs. polymer | | |
|---|---|---|---|---|---|---|---|---|---|---|---|---|---|---|
| | | | 10% | 20% | 30% | 10% runs | 20% runs | 30% runs | 10% | 20% | 30% | 10% runs | 20% runs | 30% runs |
| 1 | 250 | 0.3 | 0.02 | 0.01 | 0.01 | 1.81 | 1.29 | 1.45 | .168 | .23 | .26 | 10 | 10 | 15 |
| 2 | 350 | 0.3 | 0.02 | 0.01 | 0.01 | 1.24 | 1.29 | 1.51 | .096 | .32 | .32 | 10 | 10 | 15 |
| 3 | 550 | 0.3 | 0.02 | 0.01 | 0.01 | 1.24 | 1.29 | 1.51 | .148 | .32 | .33 | 10 | 10 | 15 |
| 4 | 200 | 0.6 | .04 | .02 | .02 | 1.46 | 1.43 | 1.49 | .394 | .43 | .59 | 10 | 10 | 15 |
| 5 | 300 | 0.6 | .04 | .02 | .02 | 1.87 | 1.11 | 1.29 | .135 | .13 | .18 | 10 | 10 | 15 |
| 6 | 200 | 0.75 | .05 | .02 | .02 | 1.40 | 1.37 | 1.37 | .49 | .22 | .18 | 10 | 10 | 15 |
| 7 | 300 | 0.75 | .05 | .02 | .02 | 1.40 | 1.37 | 1.37 | .19 | nm. | nm. | 10 | 10 | 15 |
| 8 | 140 | 0.90 | | .03 | .03 | | 1.37 | 1.29 | | 1.16 | .73 | | 10 | 15 |
| 9 | 250 | 1.0 | .05 | | | 1.4 | | | .355 | | | 66 | | |
| 10 | 140 | 2.5 | | .05 | .05 | | 1.34 | 1.24 | | 1.16 | .70 | | 10 | 15 |

The aqueous acid solution containing extracted copperamine catalyst residue is withdrawn from the bottom of extraction column 14 through conduit 22 and is passed to decantation tank 24. The decantation tank is equipped with an inlet 26 for addition of an alkali, such as caustic, to bring solution pH preferably up to about 10.0. At this pH, the amine separates out as a separate light layer that can be removed from the top of decantation tank 24 through conduit 28. In addition, copper precipitates, probably as an oxide, and the aqueous solution is passed from decantation tank 24 through conduit 30. Copper is removed in filter 32 and the acid solution may then be passed through conduit 34 to waste disposal or to an acid recovery operation.

In a most preferred embodiment of the invention, the aqueous acid solution is fed to the center of an extraction column, the polymerization reaction solution is fed to the bottom of the column and water is fed to the top of the column. By practicing the extraction process in this manner, the water passing down the column in contact with the polymer reaction solution passing up the column strips any acid that may be retained in the reaction solution. In this embodiment of the invention, the concentration of acid in the feed solution is increased to compensate for the water fed to the top of the column. The ratio of the water stream to the acid stream is adjusted so that the concentration of the acid stream leaving the bottom of the reactor, after comingling of the feed acid stream and water stream, is within the desired 10 to 30% range.

The extraction process is preferably operated at atmospheric pressures and temperatures, though higher or lower pressures and temperatures may be utilized if desired as would be obvious to those skilled in the art.

To further illustrate the process of the invention, a series of extraction separations were performed using a polymer feed solution containing from about 1.0 to 2.0% dibutyl amine, from about 0.1 to 0.2% copper as copper oxide and about 9% of a poly-(2,6-dimethyl-1,4-phenyl- From the above table, it can be seen that as the flow rate of the polymer solution increases, without corresponding increase in the acid flow rate, the efficiency of the extraction operation is decreased to the point where it is no longer acceptable from a commercial standpoint.

To determine the effectiveness of the extraction separation process of the invention, in terms of polymer contamination, polymer from Examples 1 and 5 was precipitated and analyzed for copper content. For Examples 1 and 5, copper content was found to be 15.5 and 15.0 parts per million respectively.

The acid stream removed from the column in Example 1 was collected. Its pH was found to be about 6.0. Caustic was added to the acid solution in an amount sufficient to raise pH to about 10.0. An amine layer formed which was readily separated by decantation. In addition, copper oxide precipitate was formed which was readily recoverable from the acid solution.

I claim:

1. In a process for forming a polyphenylene ether by an oxidative coupling reaction in the presence of a copper-amine complex catalyst wherein the amine forms a layer when caustic is added to an acid solution thereof comprising passing an oxygen containing gas through a reaction solution of a phenol and said copper-amine catalyst, the improvement wherein the polymerization reaction is carried out in a solution capable of liquid-liquid extraction with aqueous acid and the reaction is terminated, the copper-amine catalyst residue separated from said reaction solution by passing said reaction solution through a multi-stage extraction column countercurrently to an aqueous acid stream, and extracted amine is separated from the effluent acid stream by raising the pH of said acid stream to at least about 9.5 to form a separate layer of amine and separating said layer of amine from the remainder of said acid stream.

2. The process of claim 1 where the pH is raised to between 9.5 and 10.5.

3. The process of claim 1 where the pH is raised to about 10.0.

4. The process of claim 1 where the pH is raised with caustic.

5. The process of claim 1 where the amine is separated by decantation.

References Cited

UNITED STATES PATENTS

| 2,787,618 | 4/1957 | McCandlish | 260—247 |
| 3,069,465 | 12/1962 | Monet | 260—537 |
| 3,630,995 | 12/1971 | Modan | 260—47 |

FOREIGN PATENTS 567,114  1/1945  Great Britain.

OTHER REFERENCES

Org. Syn. Coll., vol. I, 201–202 (1941).
Org. Syn. Coll., vol. II, 318–19 (1943).
Kirk-Othmer, Encycl. Chem. Technol., vol. 2, 102 (1964).

MELVIN GOLDSTEIN, Primary Examiner

U.S. Cl. X.R.

260—247, 563 C&R, 583 N